(12) United States Patent
McKay et al.

(10) Patent No.: US 8,544,248 B2
(45) Date of Patent: Oct. 1, 2013

(54) SELF-PROPELLED LAWN MOWER WITH CHIPPER

(75) Inventors: David McKay, Howick (NZ); Agron Haraqia, Auckland (NZ); Gordon Boswell, Auckland (NZ)

(73) Assignee: Masport Limited, Auckland (NZ)

( * ) Notice: Subject to any disclaimer, the term of this patent is extended or adjusted under 35 U.S.C. 154(b) by 0 days.

(21) Appl. No.: 13/061,268

(22) PCT Filed: Aug. 26, 2009

(86) PCT No.: PCT/NZ2009/000177
§ 371 (c)(1),
(2), (4) Date: Mar. 28, 2011

(87) PCT Pub. No.: WO2010/024696
PCT Pub. Date: Mar. 4, 2010

(65) Prior Publication Data
US 2011/0239609 A1    Oct. 6, 2011

(30) Foreign Application Priority Data
Aug. 29, 2008  (NZ) ........................................ 570911

(51) Int. Cl.
*A01D 34/00*    (2006.01)

(52) U.S. Cl.
USPC .......................................................... 56/16.9

(58) Field of Classification Search
USPC ........ 56/16.4, 16.7, 16.9, 320.2; 241/101.71, 241/101.01, 37.5, 100, 101.1, 101.2, 101.5, 241/101.78
See application file for complete search history.

(56) References Cited

U.S. PATENT DOCUMENTS

| | | | | |
|---|---|---|---|---|
| 3,808,782 A | * | 5/1974 | McWilliams | 56/16.9 |
| 4,057,952 A | * | 11/1977 | Brokaw | 56/16.9 |
| 4,158,280 A | * | 6/1979 | Thomas et al. | 56/202 |
| 4,796,416 A | * | 1/1989 | Bendig et al. | 56/16.9 |
| 4,901,509 A | * | 2/1990 | Leuz | 56/16.9 |
| 5,231,827 A | * | 8/1993 | Connolly et al. | 56/13.1 |

(Continued)

FOREIGN PATENT DOCUMENTS

| | | |
|---|---|---|
| EP | 0 609 185 | 8/1994 |
| WO | 02/34028 | 5/2002 |

OTHER PUBLICATIONS

Brochure for "Series 19 MSV 550 Self Propelled" and "Series 19 MSV 3'N'1 Combo" discussed on p. 2 of the specification, 2 pages.
Information and specification for Masport mower, pp. 1-8.

*Primary Examiner* — Thomas B Will
*Assistant Examiner* — Mai Nguyen
(74) *Attorney, Agent, or Firm* — Jacobson Holman PLLC (57) ABSTRACT

A lawn mower with an integral chipper including a deck that has a volute shape with a rearwards-facing funnel along one side, expanding towards and exiting at the rear of the deck, a skirt is arranged around the perimeter of the deck to enclose a cutting space, a handle, front and rear wheel sets, and a motor having a drive shaft extending downwards through the deck. The mower also having grass cutting blades and shredder blades connected to the drive shaft, and the chipper blades located above the grass cutting blades. The mower also having a chipper tube running through the deck and opening above the chipper blades. The mower also having a power take-off mechanism connecting to the rear wheels and the motor, and adapted to drive the rear wheels in use.

12 Claims, 7 Drawing Sheets

(56) References Cited

U.S. PATENT DOCUMENTS

| | | | |
|---|---|---|---|
| 5,305,587 A * | 4/1994 | Johnson | 56/16.9 |
| 5,381,970 A * | 1/1995 | Bold et al. | 241/55 |
| 5,435,118 A * | 7/1995 | Cobile | 56/13.4 |
| 5,540,038 A * | 7/1996 | Bold et al. | 56/13.1 |
| 5,626,008 A * | 5/1997 | Puszkar | 56/17.5 |
| 5,718,105 A * | 2/1998 | Irikura et al. | 56/11.4 |

* cited by examiner

SELF-PROPELLED LAWN MOWER WITH CHIPPER

This is a national stage of PCT/NZ09/000177 filed Aug. 26, 2009 and published in English, which claims the priority of New Zealand number 570911 filed Aug. 29, 2008, hereby incorporated by reference.

BACKGROUND TO THE INVENTION

1. Field of the Invention

The present invention relates to self-propelled, walk-behind lawnmowers for cutting grass which also incorporate a shredder or chipper.

2. Summary of the Prior Art

Push-behind lawnmowers with a powered cutting mechanism are well-known. Mowers of this type normally include a generally centrally located deck or housing that includes a skirt which runs around the perimeter of the deck or housing, and a powered cutting mechanism such as a pair of rotating blades, or blades attached to a rotating cutting disc, located under the deck and skirt. Items such as the engine or power source for the blades are generally located above the deck, attached to the top of the deck. The area bounded by the deck and skirt generally forms a cutting area.

Mowers usually also include a clippings catcher which catches cut grass clippings. This is normally located at the rear of the mower, attached to the rear of the deck or housing.

While so-called hover mowers are known, such as those produced by 'Flymo', most mowers also include wheels, usually located at the corners of the deck.

Generally, there are two main ways in which mowers can be powered—electrically or by a petrol motor. Electric mowers are usually powered by an electrical cable connected between the mower and a mains outlet. Petrol powered mowers are generally known as motor mowers, with the motor included as part of the mower so the mower is self-contained or self-sufficient.

It is usual for the cutting mechanism to be formed as a disc that includes at least a pair of cutting blades, aligned at 180 degrees to one another to rotate around a central point, the tips of the blades forming a cutting circle or cutting disc as they rotate. The power for the cutting mechanism is provided from a power source to the cutting mechanism. The power source is generally located on top of the deck (e.g. the motor), and a drive shaft extends downwards through the deck to power the cutting blades. For 'push' type or user-propelled mowers of either the electric or motor mower type, a user is required to push the mower in order to move it in the direction in which they wish to proceed—the power source does not provide movement power for the mower as a whole, just the cutting mechanism. However, for some mowers, such as the 'Masport® series 19 MSV 550 self-propelled', power is also drawn from the motor in order to propel the mower forwards, a user controlling the movement direction of the mower by pushing the handle, and the speed of both the mower and (if required) the blades by way of controls on the mower handle. Mowers of this type are generally known as self-propelled mowers.

As the mower moves forward, the tips of the blades contact the grass and cut it. The motion of the blades flings the grass clippings around the inside of the mower cutting area under the deck and towards the rear of the mower in a slingshot effect. The Masport® series 19 mowers are designed to take advantage of this effect, by having a deck with an overall volute shape, with one side of the deck formed as an expanding funnel. The motion of the blades causes the grass clippings and the surrounding air to be channelled along this funnel and out of the rear of the mower. In order to maximise this effect and to increase efficiency it is important that this channel is smooth and that there are no internal impediments which might disrupt the air flow or prevent the grass clippings from being thrown to the rear of the mower.

As well as cutting grass, some types of push mowers may also be adapted to dispose of heavier garden waste or garden refuse such as a small branches or similar. This is useful where a user may not require a dedicated static chipper/shredder unit such as are known in the industry, but where the user may encounter circumstances or situations where as well as cutting the grass, they need to quickly and easily deal with or dispose of other, heavier types of garden refuse such as small windfall branches or similar. It is known to incorporate a small chipper or shredder into push mowers so that a user can achieve this. An example of a push mower that incorporates a chipper/shredder would be the 'Masport® series 19 MSV 3'N'1 Combo'. This is a user-propelled or 'push' type mower that includes a chipper shredder. A chipper tube is located on the top of the housing, aligned upwards and angled slightly backwards towards the mower handle. If a user needs to dispose of garden refuse such as small branches or similar, these are dropped or pushed into the top of the tube, passing down the tube into the cutting area under the housing and skirt. The 'Masport® series 19 MSV 3'N'1 Combo' includes a second, heavier, chipping or shredding disc or pair of blades located above the grass cutting blade, with both blades powered by a single drive shaft directly connected to the motor which is located on top of the housing, so that the grass cutting blades and the chipping blades rotate around a single axis. Refuse passing down the tube and entering the cutting area will contact the heavier chipping blades first. This refuse is chipped or shredded by the upper cutting blade or blades, and the resulting chips are disposed of in the same manner as the grass clippings produced by the lower grass cutting blade are disposed of. In the 'Masport® series 19 MSV 3'N'1 Combo, clippings are disposed of by being flung or thrown by the cutting blades around the outside perimeter of the cutting space in a centrifugal manner in a similar manner to how grass clippings are disposed of as outlined above. In order to aid in this disposal and centrifugal style throwing of clippings, the interior space under the deck and skirt (the cutting area) is volute-shaped in the Masport® Series 19 mowers. The mower deck includes an exit aperture at the rear to which a catcher can be connected in use. The chippings and grass clippings are flung around the outside perimeter of the cutting space and through this aperture. With a catcher connected to the rear of the mower, the chippings and grass clippings are collected in the catcher.

For mowers which include a chipper/shredder, where both the grass cutting blades and the chipper blades are arranged to rotate about a single axis, it is highly desirable that the deck is configured in such a manner that the rotation of the blades will sweep grass clippings and chippings around the cutting space and then into a collector or similar. In the Masport® Series 19 mowers, this is achieved by shaping the deck as a volute, as noted above, with an exit aperture extending across the rear of the mower. The clippings and chippings are swept in a circular motion around the volute and then flung backwards (and possibly slightly sideways across the mower from one side to the other), through the exit aperture and then into a collector at the rear—a circumferential slingshot effect. The exit aperture in the Masport® Series 19 mowers extends across the whole of the rear of the mower so that this sweeping effect can be achieved smoothly. It should be noted that it is desirable that the exit aperture extends at least to the centreline of the mower, so that all (or at least as much as possible) of the waste created is swept through the aperture as the cutting blades rotate.

From this, it can be seen that in mower which include a chipper/shredder, it is desirable to offset the chipper/shredder tube to one side—to the opposite side to the exit aperture and the funnel of the volute. This allows the exit aperture to be formed as large as possible, and for the exit aperture to extend across the body of the mower at least as far as the centre line of the mower, and possibly further than the centre line if the chipper tube is offset forwards. Also, it should be noted that generally chippings created by the chipper will be heavier than grass clippings, and it is highly desirable that the outer end or ends of the blades are used to sweep chippings through the cutting space, as the outer ends of the blades will be travelling fastest, and these will therefore impart as much kinetic energy to the chippings as possible. This helps ensure that the chippings have enough velocity to be thrown cleanly through the exit aperture, without dropping down through the cutting space onto the ground before reaching the exit aperture. It is therefore desirable to offset the chipper tube to one side, so that the outer ends of the blades are in general the part of the blade that contacts the items which a user is inserting into the chipper tube for chipping or shredding. It is also desirable that the ends of the blades are used for chipping and shredding, as these will be moving faster, have more energy, and will chip and shred items more easily than the inner part of the blade or blades. It should be noted that the inner (cutting space) end of the chipper tube is almost impossible to locate on the same side as the main portion of the exit aperture—i.e. within the expanding funnel of the volute. If the tube is located on this same side, then it will interfere greatly with the funnel or volute effect, as it will be required to extend downwards into the funnel so that the lower end is close to the chipping blade. Furthermore, it will either be too far back on the deck to fall within the 'sweep' of a single blade or blades rotating around a common axis to form a cutting disc (outside the circumference of the cutting disc), or if the tube is located forward (and within the blade sweep), it may also tend to sweep the chippings past the exit aperture so that they have to be swept in a full circle all the way around the cutting area before they can be thrown through the exit aperture. This increases the risk that they will fall out underneath the mower before they can be swept all the way round again to the exit aperture. These 'older' chips will also interfere with new material being fed through the tube, and this also increases the chance of chips falling out of the bottom of the mower rather than being thrown through the exit aperture. It also makes it harder for the mower deck to be formed as a compact item, with as little surface area as possible.

For self-propelled mowers, it is highly desirable to power the grass cutting blades, and the (self-)propelling mechanism from a single power source. This reduces costs and complexity. It is also highly desirable for the mechanism by which power is provided from the motor to the self-propelling source to be as simple as possible, and also for this mechanism to provide power evenly to the wheels at both sides (and possibly both ends) of the mower. That is, to provide the same torque and speed simultaneously to each of the powered wheels (usually the rear wheels only) so that the mower is not constantly pulling to one side in use and a user does not constantly have to pull the mower back on course.

In order to achieve the use of a single motor or power source to power both the blades and the wheels, a power off-take mechanism of some sort is normally used. In push type mowers, the grass cutting blades are powered e.g. by a direct drive shaft connection to the motor drive shaft. In self-propelled mowers, a power take-off mechanism such as a belt drive is used to 'take-off' power from the motor to the wheels, the belt drive connected to a gear box or similar so that power can be provided to the wheels, this arrangement also ensuring that power is evenly distributed to all the drive wheels (e.g. both rear wheels). It is highly desirable to locate the gearbox to one side—the opposite side to the funnel of the volute, so that it interferes as little as possible with the other elements of the mower such as the exit aperture, and so that the mower deck can be as compact as possible.

For the reasons outlined above, it is highly undesirable to locate the gearbox (or similar item) on the same side as the exit aperture. However, it is highly desirable to locate it to one side (rather than centrally) as this allows the exit aperture to extend across as much of the rear of the mower as possible, preferably at least as far as the centre line, or even more preferably the total width of the rear deck. This also allows the mower deck to be as compact as possible.

As outlined above, mowers that are self-propelled are known. Push type mowers that include a chipper/shredder for the disposal of heavier garden waste such as small windfall branches are also known. However, as can be seen from the above, combining self-propelled mowers with mowers that also include a chipper/shredder presents a number of problems, as fulfilling the desired requirements for one is mutually contradictory with the requirements for the other.

The term "comprising" as used in this specification means "consisting at least in part of". When interpreting each statement in this specification that includes the term "comprising", features other than that or those prefaced by the term may also be present. Related terms such as "comprise" and "comprises" are to be interpreted in the same manner.

SUMMARY OF THE INVENTION

It is an object of the present invention to provide a self-propelled mower that goes some way towards overcoming the disadvantages of the prior art such as are found with the devices described above, or which at least provides users with a useful choice.

In a first aspect the invention may broadly be said to consist in a lawn mower with an integral chipper or shredder, comprising:

a deck, having a general overall volute shape with a rearwards-facing funnel which runs along one side of said deck, expanding towards and exiting at the rear of said deck, the exit of said funnel forming an exit aperture at the rear of said deck, a skirt arranged around at least part of the perimeter of said deck, said deck and said skirt enclosing a cutting space under said deck, a handle connected to the rear of said deck, a front wheel set and a rear wheel set located at the front and the rear of said deck respectively, a motor attached to the outside top of said deck, said motor having a drive shaft extending downwards from said motor through said deck, the lower part of said drive shaft located substantially at the centre of said cutting space, at least one grass cutting blade or blades, at least one chipper or shredder blade or blades, said at least one grass cutting blade and said at least one chipper blade connected to said drive shaft within said cutting space so that in use said drive shaft causes said at least one grass cutting blade to rotate in a substantially horizontal grass cutting plane and said at least one chipper blade to rotate in a substantially horizontal chipping plane, said chipper blade located above said grass cutting blade so that said chipping plane is above said grass cutting plane in said cutting space, a chipper tube having an open upper end and an open lower end, said lower end opening into said cutting space above and within the perimeter of the chipper cutting disc formed by rotation of said at least one chipper blade in use, said mower also having a power take-off mechanism connecting to said set of rear wheel or wheels and said motor and adapted to drive said set of rear wheel or wheels in use.

Preferably said chipper tube is attached to said deck on the opposite side of the deck centre line to said funnel.

Preferably said chipper tube is attached to said deck towards the rear of said deck.

Preferably said power take off mechanism is located on the same side of said deck as said chipper tube.

Preferably said power take off mechanism is located towards the rear of said deck.

Preferably said power take-off mechanism comprises at least a gearbox, an axle, a pulley wheel and a drive belt, said axle connected to said gearbox and also connected to said rear wheel set, said pulley wheel connected to said gearbox so that rotation of said pulley wheel drives said gearbox, said gearbox adapted to turn said axle when driven by said pulley wheel so that said rear wheel set is driven in at least a forward direction, said drive belt running in a continuous loop between said motor drive shaft and said pulley wheel, said drive belt connected to said drive shaft in such a way that said drive shaft drives said drive belt, said power take off mechanism and said chipper tube arranged so that said chipper tube passes through said continuous loop of said drive belt.

Preferably the front part of said chipper tube extends to just above said chipper or shredder blade or blades, so that in use said chipper or shredder blade or blades drive refuse onto said front part, and pass just underneath said front part.

Preferably said chipper tube is angled backwards.

Preferably said chipper tube is positioned on said mower so that said tube is angled away from the direction of spin of at least said chipper or shredder blade or blades.

Preferably said power take-off mechanism further comprises a shield, adapted to protect the power take-off mechanism from chips and to prevent the mechanism becoming clogged with grass clippings.

Preferably said exit aperture and said power take-off mechanism are sized and arranged so that said exit aperture extends as far across the rear of said mower as possible.

Preferably said shield is located on the inner side of said exit aperture, as close as possible to one side of said mower.

Preferably said motor is a petrol motor.

Alternatively said motor is an electric motor.

Preferably said front wheel set is two wheels of equal size forming a pair of front wheels.

Preferably said rear wheel set is two wheels of equal size forming a pair of rear wheels.

Preferably said mower handle includes user controls.

Preferably said mower also includes a catcher, adapted to be removably attached to the rear of said mower in use, said exit aperture opening into said catcher when said catcher is attached to said mower.

Preferably said mower has a rear flap which is connected to and which pivots from the top rear edge of said deck.

Preferably said chipper tube includes a lid adapted to removably fit to said upper end of said chipper tube and close said open upper end.

Preferably said chipper blade or blades are heavier, shorter and thicker in cross-section than said grass cutting blade or blades.

Preferably said mower has four chipper blades.

Preferably said mower has four grass cutting blades.

Preferably said blades spin clockwise when said mower is viewed from above.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

A preferred form of the present invention will now be described with reference to the accompanying drawings in which.

DETAILED DESCRIPTION OF THE PREFERRED EMBODIMENTS

The present invention provides a self-propelled lawnmower which also includes a chipper or shredder.

Figure 1:
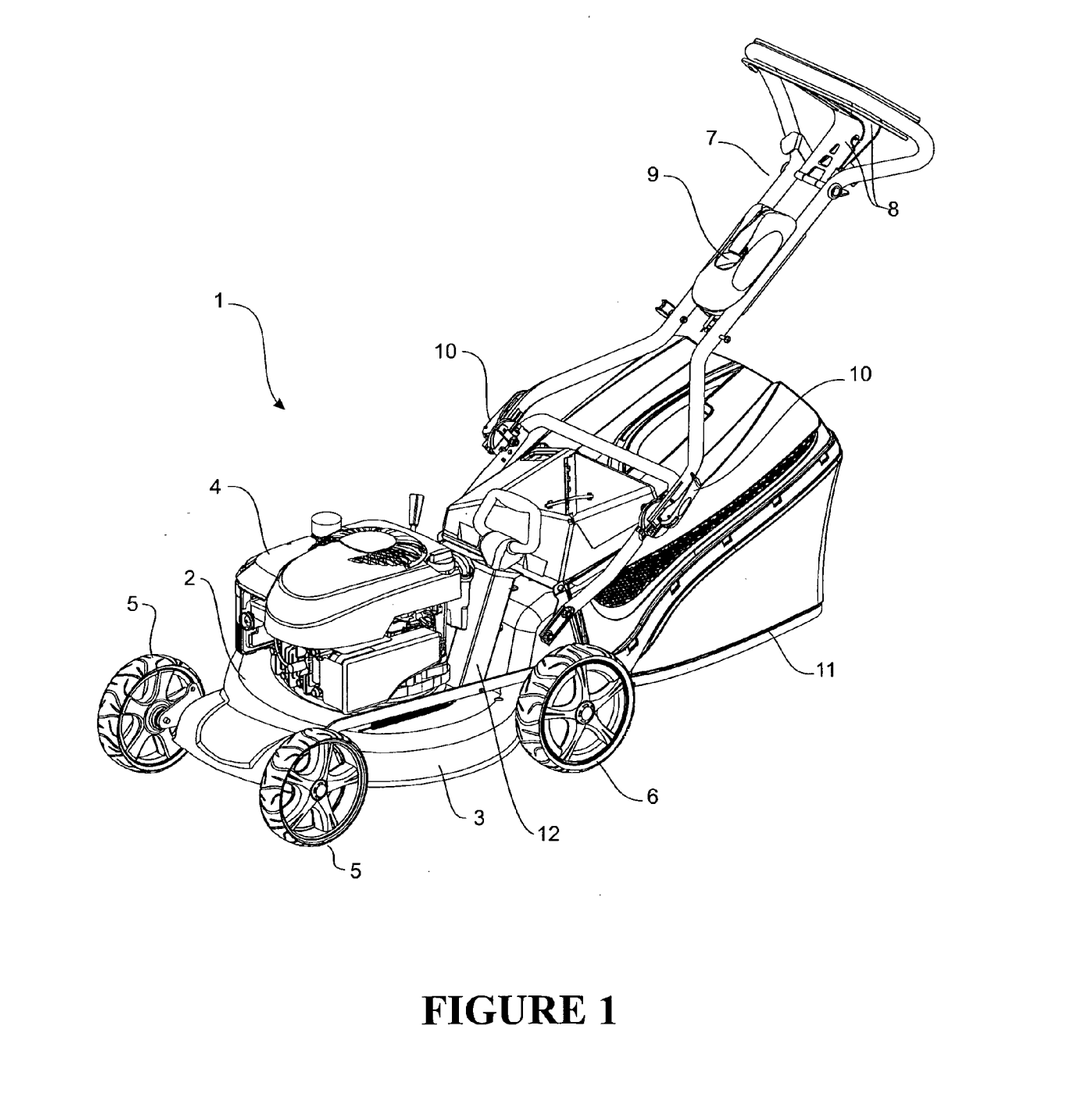
FIG. 1 shows a perspective view of a preferred embodiment of a self-propelled mower which includes a chipper, the mower having a deck with a skirt, the deck and skirt defining an internal cutting area underneath the deck in use, a petrol motor mounted on the top of the deck, a chipper tube located towards the left-hand rear corner of the deck, wheels at the corners of the deck, a grass catcher located at the rear of the deck, and a mower handle also mounted at the rear of the deck above the catcher, with user controls mounted on the mower handle.
Figure 2:
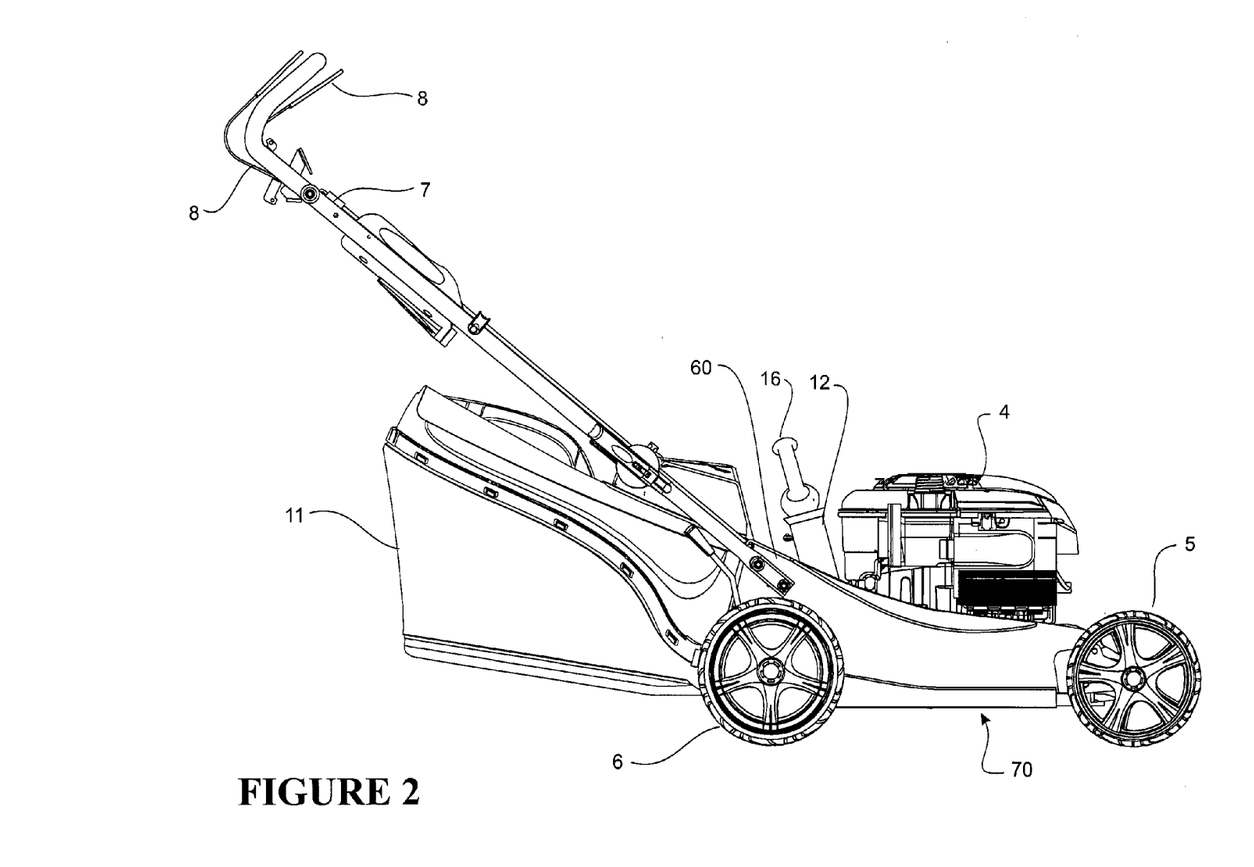
FIG. 2 shows a right hand side view of the mower of FIG. 1.
Figure 3:
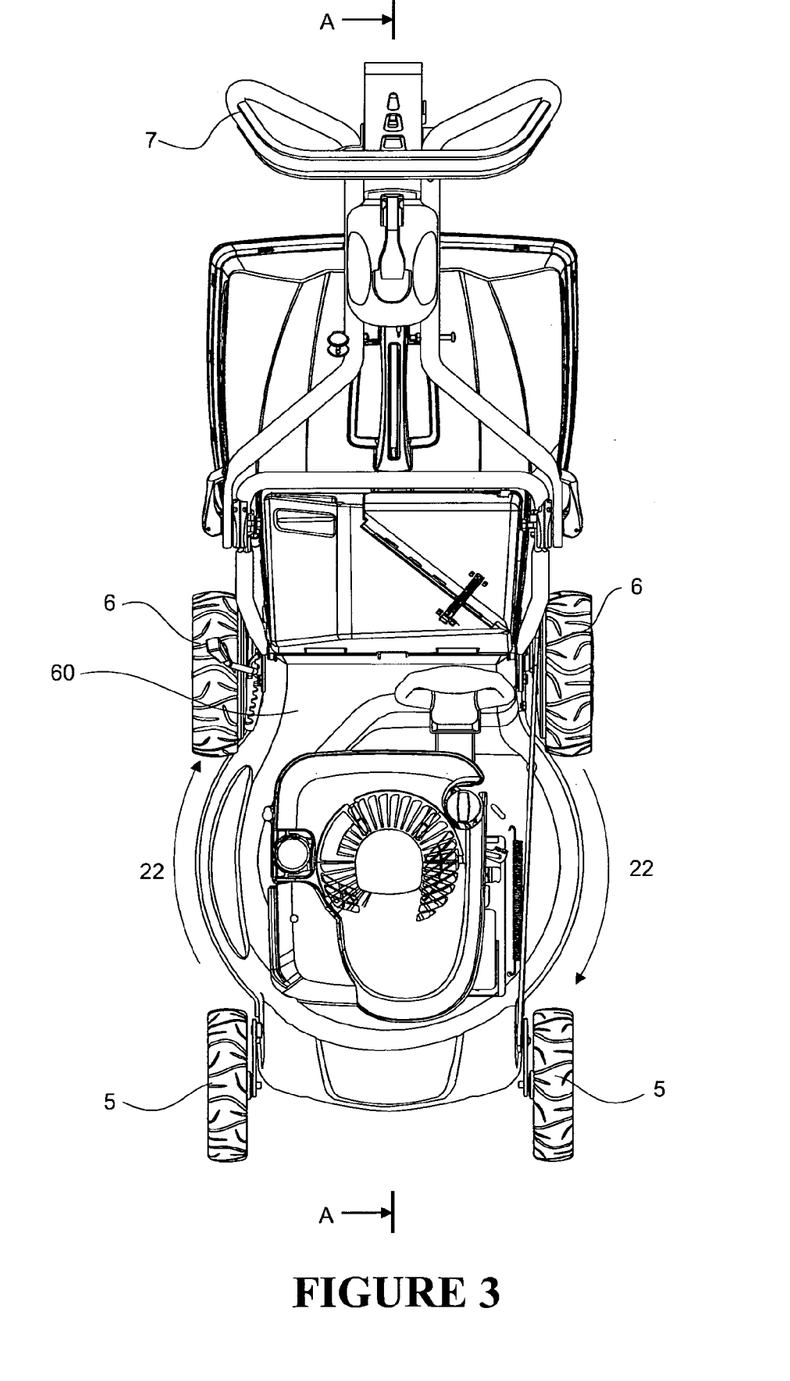
FIG. 3 shows a top view of the preferred form of mower as shown in FIGS. 1 and 2.

A mower 1 according to a preferred form of the invention is shown in FIGS. 1, 2 and 3. The main part of the mower is a deck 2 which is generally shaped to have the overall form of a volute, the deck including an expanding funnel 60 which forms part of the volute and which runs along the right hand side of the deck, expanding towards the rear of the mower. The rear of the mower deck 2 at least partly forms an exit or exit aperture for the funnel 60. The mower also has a skirt 3 which is arranged around or runs around at least part of the outer perimeter of the deck 2, the deck 2 and the skirt 3 enclosing a cutting area or cutting space 70 in use, under the deck 2 and inside the perimeter of the skirt 3. A motor 4 is attached to the mower 1, on the outside top of the deck 2, approximately at the centre of the deck 2. In the preferred form, the motor 4 is petrol powered. However, it should be noted that any form of self contained motor could be used. Alternatively, other forms could use a motor that relies on an external power supply, for example an electric motor which connects to a mains source. However, these are not preferred forms. A pair of front wheels 5 and a pair of rear wheels 6 are located at the front and rear corners of the deck 2 respectively. However, a single front wheel could be used instead of a pair. Also a single rear wheel could be used instead of a pair. A 'set' of wheels shall be used to describe the rear wheel or wheels and the front wheel or wheels, and should be read as meaning either a single wheel or a pair. A mower handle 7 is connected to the rear of the deck, approximately at the rear corners of the deck 2, above the rear wheels 6, the handle 7 running backwards and upwards. The mower handle 7 includes user controls 8. The mower handle 7 is adapted to be gripped by a user in use to control the direction in which the mower 1 is travelling, with the mower handle 7 including controls for controlling the speed at which the motor is travelling and the speed at which the cutting blades are rotating. Other secondary user controls such as a choke 9 are located on the handle 7. The mower handle 7 also includes an adjustment mechanism 10 to allow the length of the mower handle 7 to be adjusted, and other adjustments such as the orientation to be altered to suit an individual user.

A catcher 11 is connected to the rear of the mower deck 2, underneath the handle 7. The catcher 11 is removably attached to the mower deck 2 so that a user can remove it in use for emptying, maintenance or similar. When 'mower' is used in this specification, it should be noted that this could mean with or without a catcher such as catcher 11 connected to the mower. That is, 'mower' could be inclusive or exclusive of a catcher. In the most preferred form, the mower includes a rear flap 40, pivoted from the top rear edge of the deck. This is lifted up the allow the catcher 11 to be attached in use, with the rear flap resting on (and in the most preferred embodiment acting as a lid for the partly open top of) the catcher 11.

The mower 1 also includes a chipper tube 12 located at the rear left-hand corner of the deck 2 and integrally connected to the deck 2. The chipper tube 12 extends upwards from the deck 2 and is angled slightly towards the rear of the mower 1. The preferred embodiment of the chipper tube 12 has an upper entry aperture 13 at the upper end 19 of the chipper tube 12, and a lower end 14. The lower end 14 connects with the deck 2 and is mutually adapted (along with the deck 2) so that the lower end opening into the cutting space 70 and items falling down the length of the tube 12 will fall through the lower end 14 into the cutting space 70 underneath the deck 2. The upper end 19 of the chipper tube 12 in the most preferred form includes a lid 15 that has a lid handle 16, allowing a user to close off the upper end 19 in use if required.

Figure 4:
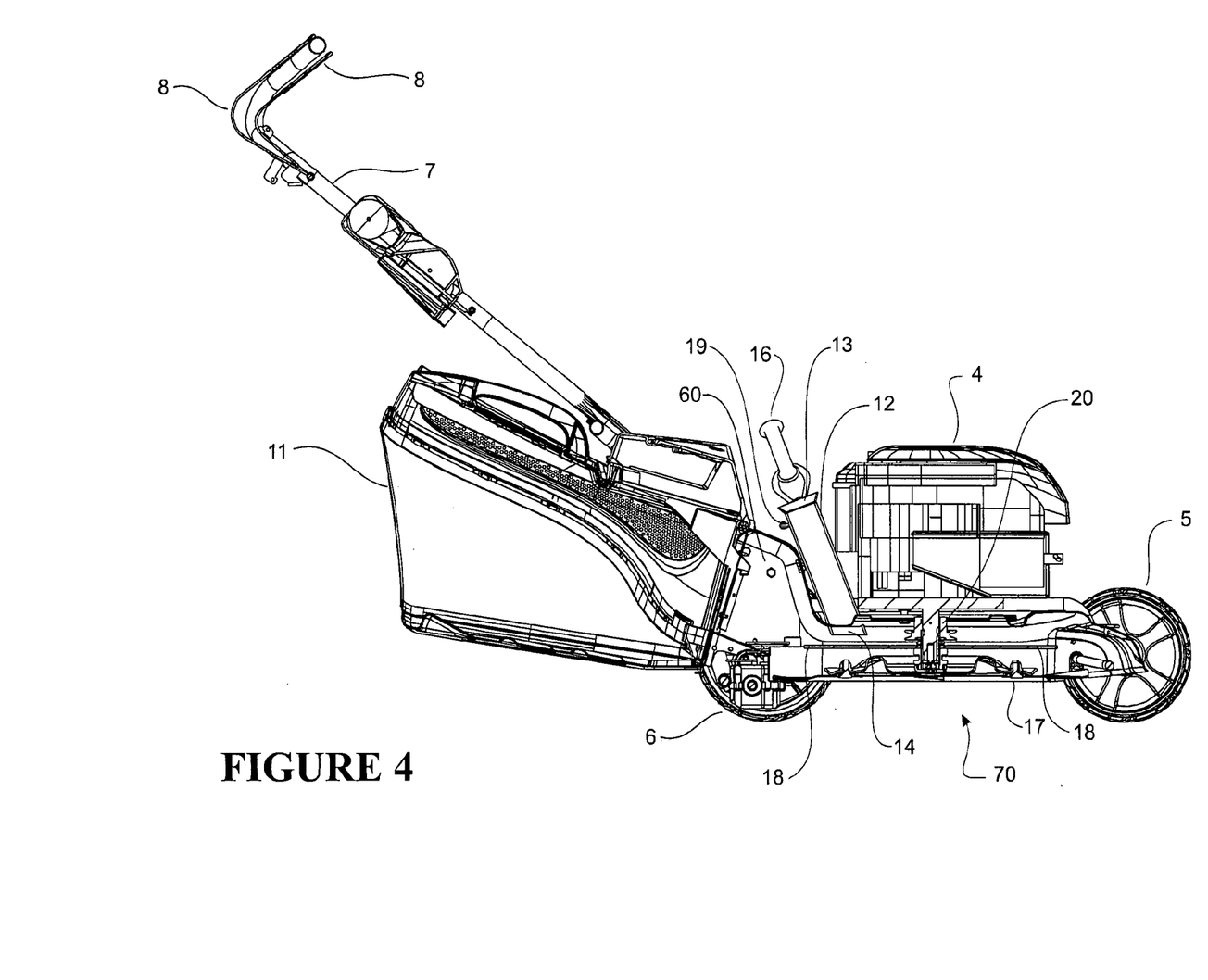
FIG. 4 shows a cutaway right hand side view of the mower of FIGS. 1 to 3, along section line A-A of FIG. 3, showing detail of the cutting area, with two sets of cutting blades located in the cutting area, an upper pair of chipper blades and a lower set of grass cutting blades, both sets of blades rotating about a common axis in use, the common axis formed by a drive shaft connected to the motor, the lower end of the chipper tube opening into the cutting area within the circumferential sweep of both sets of blades.

FIG. 4 shows a cutaway or section view along line A-A of FIG. 3. A set of grass cutter blades 17 and a set of chipper blades 18 are shown located within the cutting area. In the preferred embodiment, the chipper blades are heavy, thick, short blades attached to a disc, and the grass cutting blades are lighter, thinner, longer blades attached to a disc having a smaller radius. In the preferred embodiment, there are four chipper blades arranged at equally spaced intervals around the disc, and four grass cutting blades arranged at equally spaced intervals around a disc. However, any number of blades from one upwards could be used as required, and these do not have to be connected to a disc. The blades 17 and 18 are connected to a vertically aligned drive shaft 20, at least the lower part of which extends downwards from the motor 4 into the cutting space 70 at substantially the centre of the cutting space 70. The connection of the blades to the drive shaft causes the blades 17, 18 to rotate in substantially horizontal planes, one above the other, around a common axis. The chipper blades 17 rotate in a chipping plane, the tips of the blades defining the circumference or perimeter of a chipper cutting disc. The grass cutting blades 18 rotate in a grass cutting plane, the tips of the blades defining the circumference or perimeter of a grass cutting disc. The chipper blades 16 are located above the grass cutter blades 17. The chipper blades 18 are heavier and larger than the grass cutter blades 17, as described above. The grass cutter blades 17 are adapted so that when they are spinning, they will cut any grass which they contact. The chipper blades 18 are specifically adapted to chip or shred items such as small branches or other similar garden refuse.

It should be noted that other forms of blades are possible other than a pair of grass cutting blades 17 or a pair of chipper blades 18. Three, four or more blades could be used, possibly attached to a central disc or similar.

The lower end 14 of the chipper tube 12 is connected to the deck 2 at or towards one of the rear corners of the deck 2. In the most preferred form it is connected at the left rear corner (from the point of view of a user pushing the mower)—that is, the other side of the deck centre line from the funnel 60. The lower end 14 of the chipper tube 12 opens into the cutting space 70 as described above. As can be seen in FIGS. 3 and 4, the lower end 14 is connected to the deck 2 in such a manner that the opening at lower end 14 is directly above both sets of blades 17, 18, and within the perimeter or circumference of the cutting discs formed by rotation of the blades 17, 18. However, it is only really necessary that the opening is above the chipper blades 18 (i.e. the grass cutting blades could in theory be shorter than the chipping blades). In use, a user introduces items into the top end of the chipper tube 12, either pushing these down or allowing them to fall under gravity so that they come out of the lower end of the tube 14 into the cutting space 70, and then drop (or are pushed) into the disc formed by the rotating chipper blades 14, to be chipped or shredded. It is preferred that at least the front part of the tube 12 extends to just above the chipper blade 14, so that the front part or front face acts at least partly as an 'anvil', the blades 14 driving refuse onto the front face, and then passing just underneath the front face to chip off that part of the refuse that extends just below the lower edge of the front face.

With reference to FIG. 3, in use the operation is as follows: a user pushes the mower forwards along the grass that he or she desires to be cut, stopping occasionally to pick up heavier garden waste such as small windfall branches or similar. With reference to FIG. 3, both sets of blades 17, 18 are spinning clockwise. That is, from a users left (away from a user on the left-hand side of the mower 1) towards their right (towards a user on the right-hand side of the mower 1). This is shown by arrows 22 on FIG. 3. The front edge of the skirt 3 passes over the grass to be cut and the front edge of the spinning disc of the grass cutting blades 17 encounters the long grass in the cutting area, cutting the top portion off so that it is cut to the height of the blades 17 above the ground. The grass cuttings are flung or thrown backwards by the rotating blades 17 along the right-hand side of the cutting space 70 towards the rear of the mower 1. The mower deck 2 is shaped so that in plan view it has the shape of a volute, as noted above, and the right-hand side is funnel-shaped or forms a funnel 60, expanding towards the rear of the mower 1. At least the right-hand rear side of the mower deck 1 is formed as an exit aperture 21. That is, it is preferred that the exit aperture 21 extends at least across the right-hand half of the mower deck, to at least as far as the centre line of the mower and preferably further, across the whole rear of the deck 2, as can be seen in the top view of FIG. 3. This helps ensure that the journey of items travelling rearwards along this expanding volute passage is as smooth as possible and this increases the likelihood of all of the grass and chippings being flung or thrown cleanly from the cutting area into the catcher 11.

As outlined above, items passing through the chipper tube 12 will fall into the cutting area and fall into the cutting disc of the chipper blades 14 and will be chipped or shredded. These chips will be flung forwards along the left-hand side of the mower as the blades rotate, around the curves of the volute across the front of the mower from left to right, and then backwards along the right-hand side of the mower towards the exit aperture.

The chipper tube 12 is angled backwards, and this offers an advantage in that a user at the tear of the mower 1 can add material easily to the chipper tube 12. Also, it is much less likely that material will be ejected up and out of the tube 12 in use, as it is angled away from the direction of spin of the blades 17, 18. This is safer for a user.

As can be seen in FIG. 3, the chipper tube 12 is located at the rear left-hand corner of the mower deck 2, just in front of the left-hand rear end corner of the volute-shaped deck 2.

Figure 5:
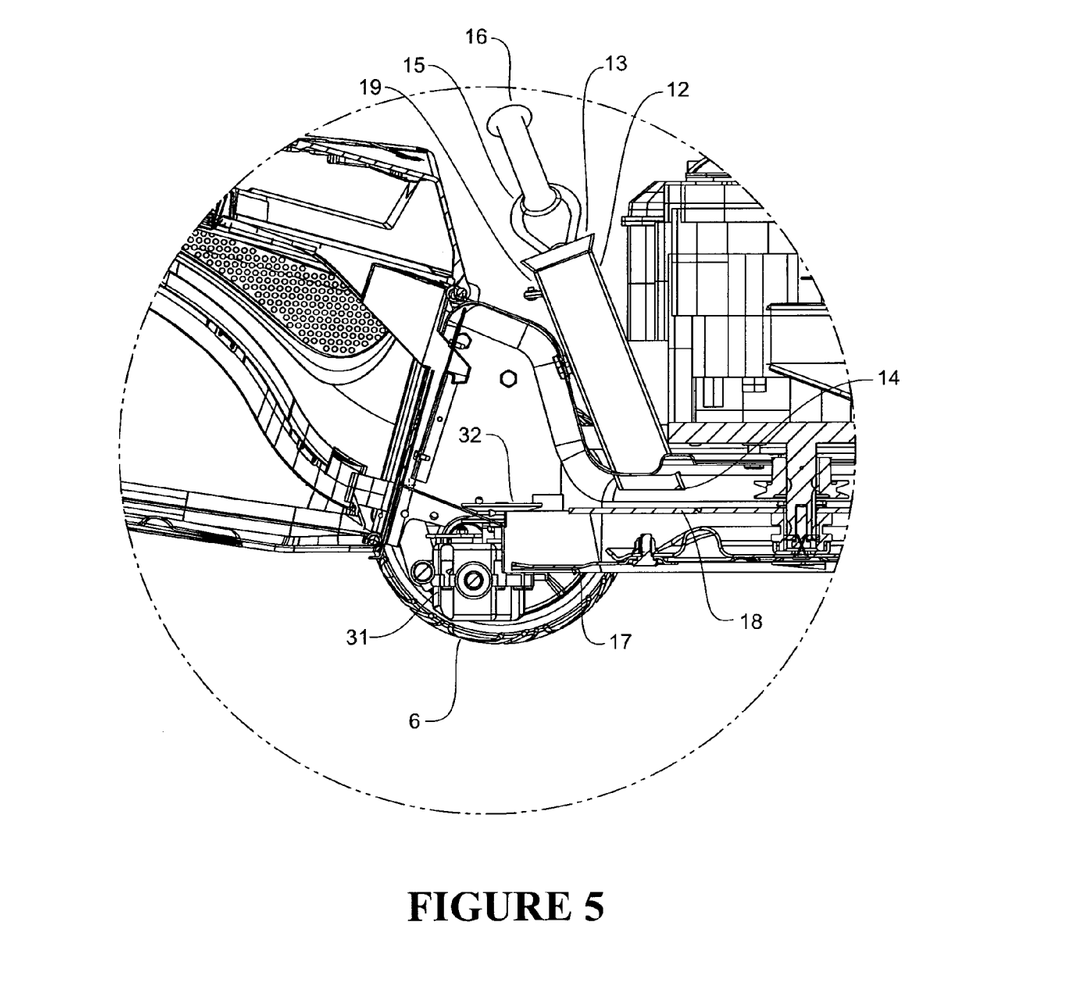
FIG. 5 shows a close-up detail view of the rear section of the mower of FIG. 4, showing detail of the rear of the deck at the point where the catcher is connected to the deck, and detail of the chipper tube entry and connection to the deck, with a gearbox located at the rear also shown.

The self-propelling mechanism of the preferred embodiment of the mower of FIG. 1 shall now be described with reference to FIGS. 4, 5, and 6.

Figure 6:
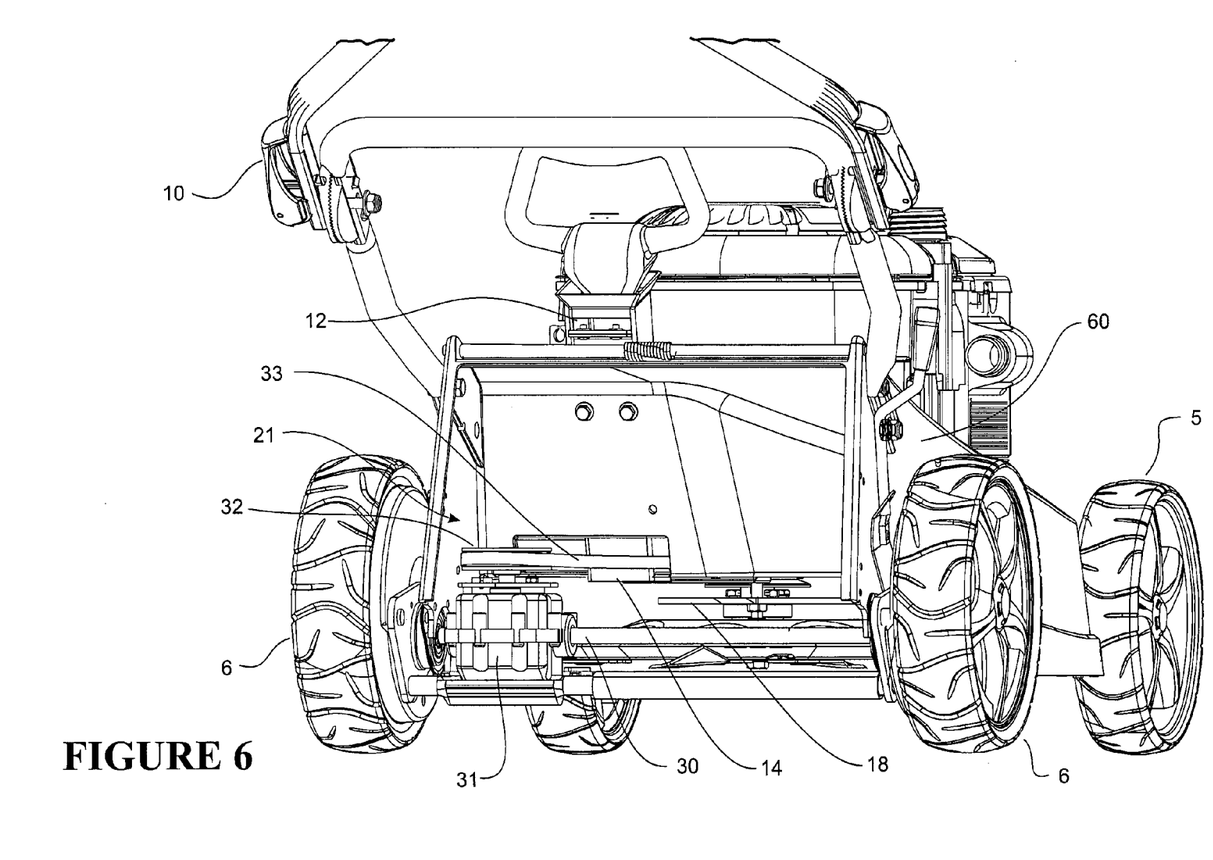
FIG. 6 shows a view from the rear of the mower looking forwards, without a catcher attached, with detail of a power take-off mechanism for a mower self-propelling mechanism shown, the power take off mechanism including a gearbox, a pulley and a drive belt.

As best shown with reference to FIG. 6, a rear axle 30 runs across the rear of the deck 2 between the rear wheels 6. A gearbox 31 is located underneath the deck 2, located in the left-hand rear corner of the deck 2, the axle 30 passing through the gearbox 31 in use. In order to provide motive power to the wheels 6, the axle 30 is aligned horizontally. A power take-off pulley wheel 32 is shown connected to the top of the gearbox 31, rotating around a vertical axis in use, the gearbox 31 converting the rotation of the pulley wheel 32 to rotation around a horizontal axis so that the wheels 6 rotate and drive the mower forwards. The pulley wheel 32 is driven by means of a belt 33, the rear portion of which runs around the pulley wheel 32 and the front portion of which runs around a driveshaft pulley (not shown). As the driveshaft rotates, the drive belt 33 is driven, causing the pulley wheel 32 to rotate and in this manner providing power to the axle 30 via the gearbox 31. In this preferred embodiment as shown in FIG. 6, the axle 30 is clearly slightly offset from axis of rotation of the rear wheels 6, with cogs or similar (not shown) used to transfer the power to the rear wheels 6 from the axle 30. The axle 30, the gearbox 31, the pulley wheel 32 and the belt 33 together form what can generally be referred to as a power take-off mechanism, 'taking off' power from the motor to the wheel to provide the required self-propulsion to the mower. These items together form the preferred embodiment of power take off mechanism (although other arrangements could be used if required). The power take off mechanism runs between or connects the rear wheel or set of rear wheels and the motor 4, and is adapted to drive the rear wheels in use.

Figure 7:
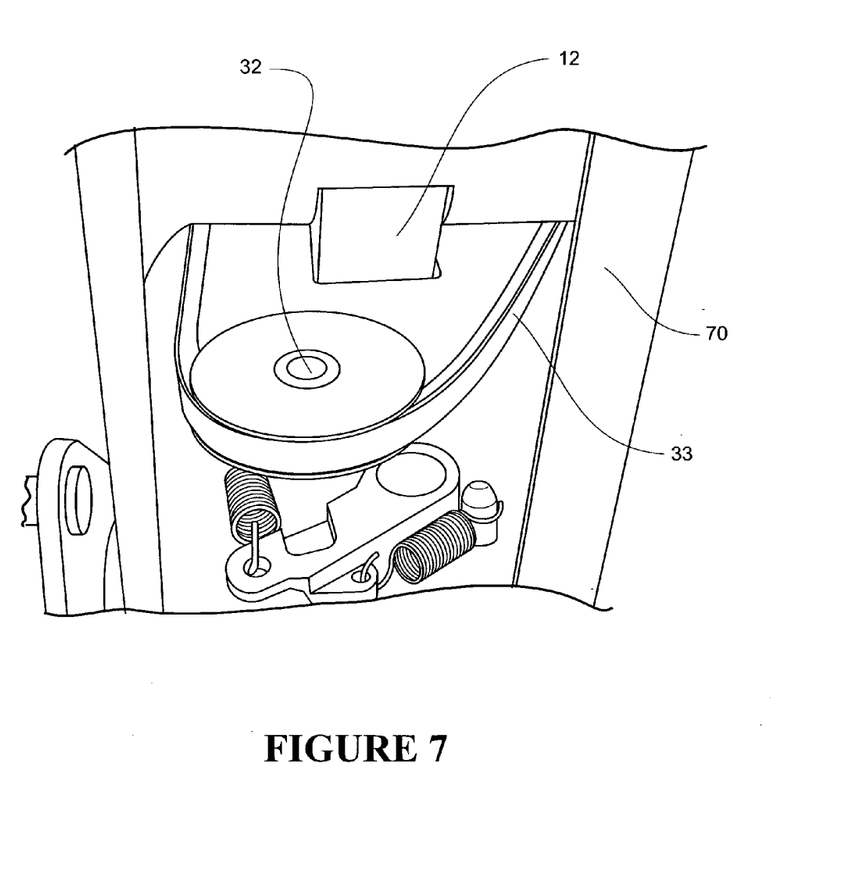
FIG. 7 shows a close-up view from the rear of the mower of FIG. 6, looking forwards and downwards, showing detail of the gearbox, pulley and drive belt.

As can be seen in FIG. 7, the gearbox 31, the pulley wheel 32 and the belt 33 are arranged so that in use the sides of the pulley belt 33 run each side of the chipper tube 12. This arrangement has proved unexpectedly advantageous. As has already been outlined, in order to operate properly, the exit aperture and the funnel 60 of the volute must be kept clear so that the air flow and flow of grass cuttings and chips is as smooth as possible along the funnel 60 and through the exit aperture. This makes it very difficult to locate a power take-off mechanism on this side of the mower, as items such as the belt 33 will interfere with the cutting blades 17, 18 and greatly impede the flow of chippings upwards and backwards through the exit aperture (at least some of the grass clippings will have to pass up from below the belt 33 to above the belt 33). A bulky item such as the gearbox 31 will also interfere with the smooth flow if located on the same side as the funnel 60. It is therefore necessary to locate the elements that form the power take-off mechanism (e.g. axle 30, gearbox 31, pulley wheel 32, belt 33 in the preferred embodiment) on the opposite side of the mower 1 to that of the funnel 60, and preferably as far over to one side as possible. This means that they are required to be located on the same side of the mower 1 as the chipper tube. Also shown in FIG. 7 is a shield 70, to protect the power take-off mechanism from chips and to prevent the mechanism becoming clogged with grass clippings or similar. This item is not shown in FIG. 6—it has been removed. As outlined above, it is most preferred that the exit aperture extends across as much of the rear of the mower 1 as possible, and therefore the shield 70 is over as far left as possible (user P.O.V)—that is, located on the inner side of the exit aperture, as close as possible to one side (the left-hand side in the preferred embodiment) of said mower. In the most preferred embodiment, and as can best be seen with reference to FIGS. 4, 5 and 6, the gearbox 31 is offset below the pulley wheel 32 and the belt 33. That is, the gearbox is situated towards the ground in use, connected to the remainder of the mower so that the body of the gearbox (and therefore the other items of the power take off mechanism also) is as close to the ground as possible, or just above the surface of the ground (with a certain amount of clearance built in to avoid the gearbox 'grounding' on ridges or similar in the lawn, as can best been seen in FIG. 6. The actual amount of clearance will be a matter of design consideration, with 'as close to the ground as possible' understood to mean that a certain amount of clearance suitable for the application has been built into the mower). Locating the gearbox below the other elements, and as low as possible, can in some embodiment have the advantage of allowing the exit aperture to extend as far as possible across the rear of the mower without as little interference as possible with items such as the power take-off mechanism and the gearbox.

As has been noted above, a single rear wheel could also be used, preferably substantially centrally located, with the power take-off mechanism driving the single rear wheel.

The preferred embodiment of the mower 1 described above reconciles the mutually contradictory requirements for a self-propelled mower that also includes an integral chipper/shredder—it solves the problem that the requirements for a self-propelled mower and for a mower that includes an integral chipper/shredder are at some points mutually contradictory. Surprisingly, a mower having the features such as are described in the preferred embodiment as described above reconciles these requirements to provide a self-propelled mower that includes an integral chipper shredder. In the very most preferred embodiment, the chipper tube 12 is arranged on the mower 1 in such a manner (along with the power take-off mechanism) that the chipper tube 12 passes down through the loop of the belt 33. This has proved advantageous in that the size of the deck 2 and therefore the mower 1 can be kept as compact as possible.

We claim:
1. A lawn mower with an integral chipper, comprising:
   a deck, having a general overall volute shape with a rearwards-facing funnel which runs along one side of said deck, expanding towards an exit at the rear of said deck, the exit of said funnel forming an exit aperture at the rear of said deck, a skirt arranged around at least part of the perimeter of said deck, said deck and said skirt enclosing an open-bottomed cutting space under said deck, a handle connected to the rear of said deck, a front wheel set and a rear wheel set located at the front and the rear of said deck, respectively, a motor attached to the outside top of said deck, said motor having a drive shaft extending downwards from said motor through said deck, the lower part of said drive shaft located substantially at the center of said cutting space, at least one grass cutting blade, at least one chipper blade, said at least one grass cutting blade and said at least one chipper blade being connected to said drive shaft within said cutting space so that in use said drive shaft causes said at least one grass cutting blade to rotate in a substantially horizontal grass cutting plane and said at least one chipper blade to rotate in a substantially horizontal chipping plane, said chipper blade being located above said grass cutting blade so that said chipping plane is vertically spaced from said grass cutting plane in said cutting space to allow chipping of garden waste while simultaneously mowing grass, and a chipper tube having an upper end and a lower end, said lower end opening into said cutting space above and within a perimeter of a chipper cutting disc formed by rotation of said at least one chipper blade in use, a longitudinal deck center line, said chipper tube being attached to said deck on an opposite side of the longitudinal deck center line from the one side of the deck, said mower also having a power take-off mechanism connecting to said rear wheel set and said motor and adapted to drive said rear wheel set in use, said power take-off mechanism including at least a gearbox, a pulley wheel and a drive belt, an axle being connected to said gearbox and also connected to said rear wheel set, said pulley wheel being connected to said gearbox so that rotation of said pulley wheel drives said gearbox, said gearbox adapted to turn said axle when driven by said pulley wheel so that said rear wheel set is driven in at least a forward direction, said drive belt running in a continuous loop between said motor drive shaft and said pulley wheel, said drive belt being connected to said drive shaft in such a way that said drive shaft drives said drive belt, said power take off mechanism and said chipper tube being arranged on a same side of the deck, said chipper tube passing through said continuous loop of said drive belt.

2. The lawn mower as claimed in claim 1 wherein said chipper tube is attached to said deck towards the rear of said deck.

3. The lawn mower as claimed in claim 1 wherein said power take-off mechanism is located towards the rear of said deck.

4. The lawn mower as claimed in claim 1 wherein said power take-off mechanism is connected to said mower in such a manner that said power take-off mechanism is close to the ground.

5. The mower as claimed in claim 1 wherein said gearbox, said pulley wheel and said drive belt are connected to said mower in such a manner that said gearbox is below said pulley wheel and said drive belt in use.

6. The mower as claimed in claim 5 wherein said gearbox is connected to said mower so that said gearbox is close to the ground.

7. The mower as claimed in claim 1 wherein a front part of said chipper tube extends to just above said chipper blade, so that in use said chipper blade drives refuse onto said front part, and passes just underneath said front part.

8. The mower as claimed in claim 1 wherein said chipper tube is angled backwards.

9. The mower as claimed in claim 1 wherein said chipper tube is positioned on said mower so that said tube is angled away from the direction of spin of at least said chipper blade.

10. The mower as claimed in claim 1 wherein said power take-off mechanism further comprises a shield, adapted to protect the power take-off mechanism from chips and to prevent the mechanism becoming clogged with grass clippings.

11. The mower as claimed in claim 1 wherein said exit aperture and said power take-off mechanism are sized and arranged so that said exit aperture extends to at least as far as the center line of said mower.

12. The mower as claimed in claim 10 wherein said shield is located on the inner side of said exit aperture.

\* \* \* \* \*